F. O. STROMBORG.
POULTRY RUN.
APPLICATION FILED DEC. 11, 1919.
1,374,120.
Patented Apr. 5, 1921.
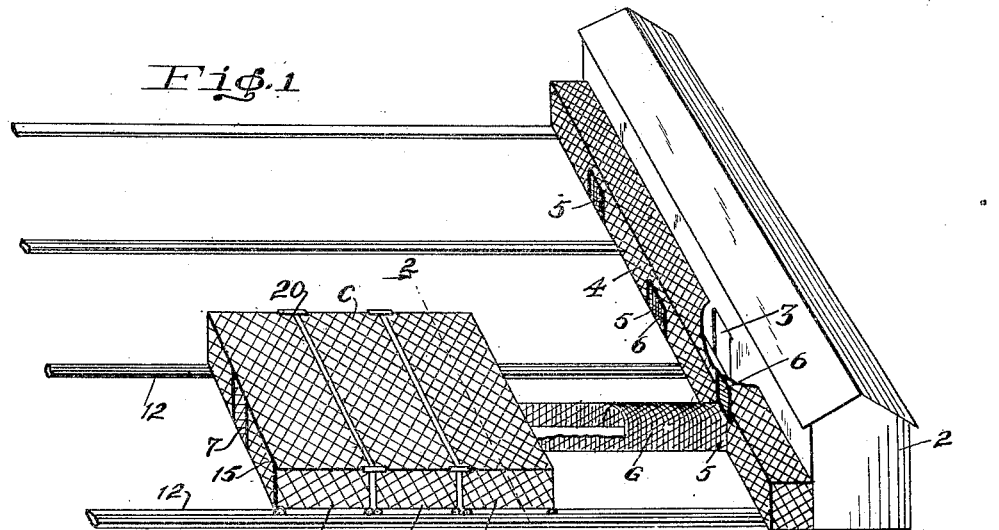
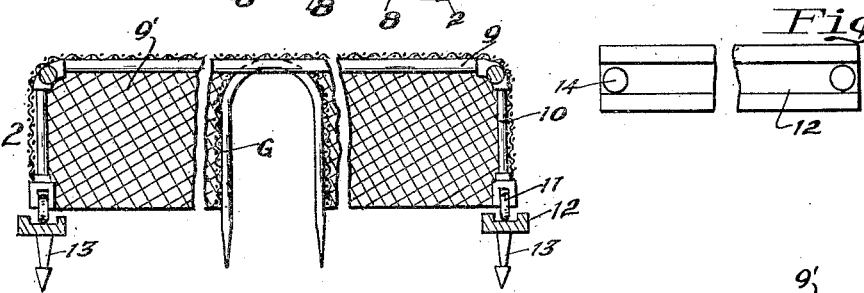
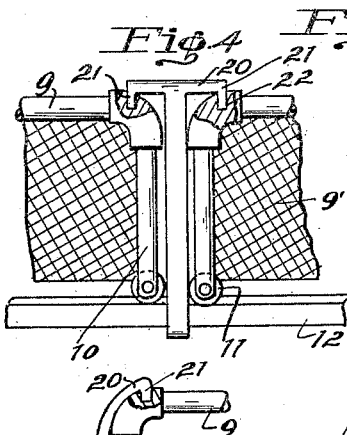
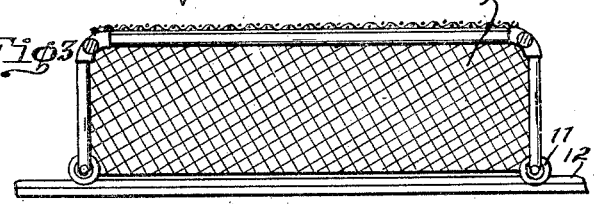
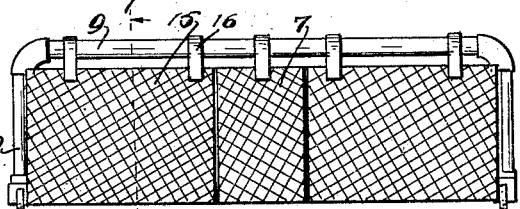
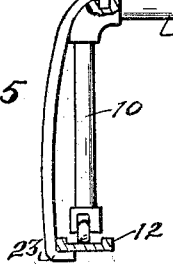
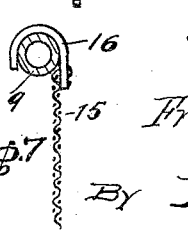
INVENTOR
Fritz Oscar Stromborg
By Hazard & Miller
Att'ys

UNITED STATES PATENT OFFICE.

FRITZ OSCAR STROMBORG, OF LOS ANGELES, CALIFORNIA.

POULTRY-RUN.

1,374,120. Specification of Letters Patent. Patented Apr. 5, 1921.

Application filed December 11, 1919. Serial No. 344,157.

*To all whom it may concern:*

Be it known that I, FRITZ OSCAR STROMBORG, a citizen of the United States, residing at Los Angeles, in the county of Los Angeles and State of California, have invented new and useful Improvements in Poultry-Runs, of which the following is a specification.

This invention relates to husbandry and particularly to improvements in poultry runs, and has for its object to provide an apparatus in which a restraining cage may be readily shifted from place to place with respect to a fixed poultry house or shed, and to provide means for controlling the exit of the chickens or poultry from the poultry house to a limiting and transferable feeding cage so that they can be given new ground to run over from time to time and permit ground that has previously been used for the chicken run to produce new growth and be thoroughly cleaned and cultivated as may be desired with the object especially in view of facilitating the feeding of the chickens and for improving the sanitary conditions. The invention consists of the construction and details an embodiment of which is illustrated in the accompanying drawings and described and claimed herein.

Figure 1 is a perspective of the improved poultry apparatus, parts being broken away.

Fig. 2 is a vertical section on line 2—2 of Fig. 1 and looking in the direction of the arrow.

Fig. 3 is a transverse section through one of the cage sections.

Fig. 4 is a detail sectional view showing means for interlocking adjacent ends of contiguous sections.

Fig. 5 is an edge view of the fastening device of Fig. 4.

Fig. 6 is an end view of one of the removable end walls and gate of a cage section.

Fig. 7 is a transverse section through a cage bar with the removable gate attached, the section being on line 7—7 of Fig. 6.

Fig. 8 is a plan view of a detail.

As is well known the constant daily use of a given piece of ground by a number of chickens soon results in the entire depletion of grass or other surface growth with the result that not only will the chickens be deprived of the required fresh green substances but also the growth being rapidly denuded cannot maintain its activity and reproduce, and it is an object of the present invention to provide a substantially portable poultry runway that can be changed from time to time to different positions of a given ground area so that the poultry can be substantially constantly fed on fresh growing green stuff and at the same time the previously used area of the ground will be permitted to denew its growth and can be cultivated as may be desired to facilitate the green growth.

In the present disclosure a poultry house 2 of any suitable construction and proportions is employed, one of the longitudinal walls being provided with one or more outlets 3 leading into a longitudinally extending passage way or tunnel 4 to and from which the chickens from the poultry house 2 may have ready access through the openings 3 in the adjacent wall. The longitudinally extending passage way or tunnel 4 is provided with a series of outlets or openings 5 as will be determined by the size of the running area or ground and also by the size of a restraining cage or coop structure such as is generally indicated at C in Fig. 1, and which coop or cage structure is designed to be shifted from place to place toward or from or parallel to the passage way 4 along the side of the poultry house so as to confine the inclosed chickens in the coop C to an area of ground covered by the same.

To prevent the chickens from scattering and to guide them directly from the given passage way outlet 5 to the restraining coop or cage C, a transversely extending connecting guide cage G is provided, this being adjustable over the mouth of the selected outlet 5 and placed conveniently to the adjacent end of the coop C as by the removal from the latter of a detachable or movable gate 7 to which the opening thus formed in the cage section can be registered with the adjacent end of the guide way G. Those outlets 5 of the longitudinal passage way 4 that are not to be used are covered by any suitable gate or closure one of which is shown in the uncovering position at 6 in Fig. 1.

The restraining cages or coops may be built of any suitable material and desired proportions and may be constructed of sections for convenience of changing the position of the coop from time to time, and in this case the coop C is shown as formed of three parallel sections 8—8—8; these sections each consisting of a suitable framework 9, Fig. 2, with cross and end top bars or rails at the corners of which are supporting legs 10 that may rest directly upon the ground or any suitable supporting device, but preferably are provided with rollers 11 to facilitate the movement of the section toward or from the poultry house as along fixed or movable tracks 12 that may be arranged in parallel relation and suitably disposed with relation to the poultry house 2.

The tracks 12 may, if desired, be securely fastened in given position by means of retaining spikes or posts 13 that can be driven into the ground and having heads arranged in openings 14 provided at suitable locations in the rails 12.

The coop sections may be built of wire netting of suitable mesh or of lattice work as may be desired so as to provide ample ventilation and light, and in the present case, the framework is shown as provided with wire netting 9' which extends along sides of each of the sections 9 and across the top thereof on intermediate sections, and the end sections of each cage are provided with removable frame or panel sections 15 of suitable length and having hooks 16 at the upper ends designed to be dropped over the transverse member 9 of the coop section, so that the open transverse ends of the coop sections can be temporarily closed according to the position of the section in the assembly of the cage or coop. There may be interposed between the removable end panels 15 of a given end cage section the removable gate 7 that can be detached or opened to be registered with the adjacent end of the guide G.

The adjacent corners of contiguous coop sections can be interlocked or connected securely together to prevent separation by any suitable device, as for instance a T-shaped latch 20 having downturned projections 21 at the ends of its head to enter into notches or seats 22 provided in the adjacent framework of the section, and the lower end of the latching or fastening member 20 can be hooked in under the adjacent rail 12 as at 23.

Various changes may be made without departing from the spirit of my invention as claimed.

I claim:

1. A poultry run apparatus including a poultry house, tracks extending from said poultry house, a cage composed of a plurality of sections, wheels upon which said sections are mounted to travel on said tracks, the frames of said sections having notches in the upper part thereof, T-shaped bars formed with down turned ends on their cross members adapted to fit in notches in adjacent frames to hold adjacent sections together, the lower end of said bars being bent under said tracks, said poultry house having an outlet, said cage having an inlet, and a guide passage connecting said outlet and said inlet.

2. A poultry run apparatus including a poultry house, tracks extending from said poultry house, a cage composed of a plurality of sections, wheels upon which said sections are mounted to travel on said tracks, the frames of said sections having notches in the upper part thereof, bars having down turned ends adapted to fit in notches in adjacent frames to hold adjacent sections together, said poultry house having an outlet, said cage having an inlet, and a guide passage connecting said outlet and said inlet.

3. In a device of the character described, the combination with a poultry house, of a passage way extending along one side of the house, openings from the house into the passage way and openings in the opposite side of said passage, tracks extending outwardly from said passage at right angles thereto, a coop longitudinally movable on said tracks, said coop consisting of a plurality of connectible sections, each section comprising a frame constructed of a pair of inverted U-shaped side frames extending transversely of the tracks with end braces therebetween, reticulated covering over the top and ends of said frame, reticulated removable side walls supported on said frame, and rollers on the downwardly extending arms of the frames for movably supporting them upon the tracks, means to interlock contiguous sections together and to the tracks, openings in the side walls of the coop, and a guide way connecting adjacent openings in the coop and passage.

4. In a device of the character described, the combination with a poultry house, of a passage way extending along one side of the house, openings from the house into the passage and openings in the opposite side of said passage, a plurality of tracks extending outwardly from said passage at right angles thereto, a coop longitudinally movable on said tracks, said coop consisting of a plurality of connectible sections with removable side walls, means to interlock said sections together and to the tracks, openings in the removable side walls, and a guide way to connect adjacent openings in the coop and passage way.

5. In a device of the character described, the combination with a poultry house, of a longitudinally extending passage way extending along one side of said house, openings from said house into said passage, openings in the opposite side of said passage, tracks extending outwardly from said passage at right angles thereto, a coop shiftably mounted on said tracks, said coop comprising a plurality of connectible sections with removable side walls, openings in the side walls of said coop and a guide way connecting the adjacent opening in the coop with an adjacent opening in the passage.

In testimony whereof I have signed my name to this specification.

FRITZ OSCAR STROMBORG.